US012631318B2

(12) United States Patent
Liu et al.

(10) Patent No.: US 12,631,318 B2
(45) Date of Patent: May 19, 2026

(54) DIAL ILLUMINATION LAMP

(71) Applicant: FOSHAN ELECTRICAL AND LIGHTING CO., LTD., Foshan (CN)

(72) Inventors: Xiaofei Liu, Foshan (CN); Shijun Fan, Foshan (CN); Yong Zhang, Foshan (CN); Fuguo Huang, Foshan (CN); Jiabin Zeng, Foshan (CN); Yi Yang, Foshan (CN)

(73) Assignee: FOSHAN ELECTRICAL AND LIGHTING CO., LTD., Foshan (CN)

( * ) Notice: Subject to any disclaimer, the term of this patent is extended or adjusted under 35 U.S.C. 154(b) by 0 days.

(21) Appl. No.: 18/957,920

(22) Filed: Nov. 25, 2024

(65) Prior Publication Data

US 2025/0305666 A1 Oct. 2, 2025

(30) Foreign Application Priority Data

Mar. 28, 2024 (CN) ........................ 202410367857.0

(51) Int. Cl.
*F21V 23/04* (2006.01)
*F21V 17/12* (2006.01)
*F21V 23/00* (2015.01)

(52) U.S. Cl.
CPC .............. *F21V 23/04* (2013.01); *F21V 17/12* (2013.01); *F21V 23/002* (2013.01)

(58) Field of Classification Search
CPC ......... F21V 23/04; F21V 23/002; F21V 17/12
See application file for complete search history.

(56) References Cited

U.S. PATENT DOCUMENTS 7,416,312 B1 * 8/2008 McDermott ............ F21V 5/046 362/244
9,551,477 B2 * 1/2017 Chien ..................... F21V 29/70
11,333,334 B2 * 5/2022 Dixit ....................... F21V 21/35
11,512,839 B1 * 11/2022 Delalande ............... F21V 29/70
11,619,373 B2 * 4/2023 Halliwell ................ F21V 17/02 362/235
2011/0115414 A1 * 5/2011 Ku ............................ F21V 3/00 315/313

* cited by examiner

*Primary Examiner* — Matthew J. Peerce

(57) ABSTRACT

The present disclosure provides a dial illumination lamp, including a housing, a light source assembly, and an adjustment assembly connected to the light source assembly. The light source assembly includes a light source plate and a light source. The adjustment assembly includes a dial member and a contact member. The dial member has one end hinged to the light source plate; connecting contacts are provided on the light source plate; the contact member is capable of being in contact with the connecting contacts; the dial member is capable of swinging around a position where the light source plate is hinged to the dial member; and the dial member in swinging drives the contact member to slide between the different connecting contacts. The present disclosure is small in volume and simple in structure, saves space, and facilitates the achievement of miniaturization and integration of lamps.

17 Claims, 10 Drawing Sheets

DIAL ILLUMINATION LAMP

CROSS REFERENCE TO RELATED APPLICATIONS

The present application claims the benefit of Chinese Patent Application No. 202410367857.0 filed on Mar. 28, 2024, the contents of which are incorporated herein by reference in their entirety.

TECHNICAL FIELD

The present disclosure relates to the technical field of lamps, and in particular, to a dial illumination lamp.

BACKGROUND

Lamps are common daily supplies. Among the lamps, dial dimming lamps are often configured to adjust parameters such as color temperature and power of output light to meet different needs of users. In existing dial dimming lamps, the adjustment device is a key component for achieving lamp adjustment. Typically, the adjustment device in a dimming lamp includes a dial button, a wiring terminal, and a wiring base. The dial button is a sliding mechanism, and can be connected to a housing and implement a sliding operation. The dial button is connected to the wiring terminal, and the wiring terminal protrudes towards the wiring base. The wiring base is provided with a plurality of energizing terminals, and the energizing terminals protrude towards the wiring terminal. The wiring terminal can supply power to a light source when being connected to the energizing terminals. The dial button in sliding can drive the wiring terminal to move, such that the wiring terminal is connected to different energizing terminals to change a current input into the light source, thereby achieving the effect of parameter adjustment. However, to accommodate the wiring terminal and the energizing terminals and ensure that the wiring terminal can smoothly move, the adjustment device is often designed to be bulky. Moreover, the complex internal structure of the adjustment device also places high demands on layout design and assembly accuracy. This design not only increases the difficulty of production and assembly, but also limits the development of lamps in terms of miniaturization and integration.

SUMMARY

The technical problem to be resolved by the present disclosure is to provide a dial illumination lamp, which is small in volume and simple in structure, saves space, and facilitates the achievement of miniaturization and integration of lamps.

To solve the above technical problem, the present disclosure provides a dial illumination lamp, including a housing, a light source assembly provided in the housing, and an adjustment assembly connected to the light source assembly, where the housing includes a housing body; the light source assembly includes a light source plate and a light source provided on the light source plate; the light source plate is connected to the housing body;

the adjustment assembly includes a dial member and a contact member; the dial member has one end hinged to the light source plate; the contact member is connected to the dial member; the contact member abuts against the light source plate; connecting contacts are provided on the light source plate; the contact member can be in contact with the connecting contacts; the dial member can swing around a position where the light source plate is hinged to the dial member; and the dial member in swinging drives the contact member to slide between the different connecting contacts.

As an improvement to the above solution, the contact member is an elastic sheet, and the contact member is connected to the dial member through a fastener, or the contact member is inserted into the dial member.

As an improvement to the above solution, the contact member is provided with sliding contacts, and the sliding contacts can be in contact with the connecting contacts.

As an improvement to the above solution, there are two sliding contacts, and the two sliding contacts are respectively disposed on two sides of the fastener, or the sliding contacts are both disposed on a same side of the fastener.

As an improvement to the above solution, a connecting hole is formed in the dial member, and the contact member is inserted into the connecting hole.

As an improvement to the above solution, there are two sliding contacts, and the two sliding contacts are disposed on a same side of the connecting hole.

As an improvement to the above solution, a hinge portion is provided at one end of the dial member, a dial sheet portion is provided at the other end of the dial member, a hinge hole is formed in the light source plate, the hinge portion can be inserted into the hinge hole, a clamping bump is provided at an end part of the hinge portion, the clamping bump protrudes from a side wall of the hinge portion and abuts against the light source plate, the dial sheet portion can swing around the hinge hole, and the dial sheet portion protrudes towards an outer side of the housing body.

As an improvement to the above solution, the dial member further includes a first connecting plate and a connecting portion, the first connecting plate is connected between the hinge portion and the dial sheet portion, the connecting portion protrudes from the first connecting plate, and the contact member is connected to the connecting portion.

As an improvement to the above solution, an adjustment hole is formed in a side wall of the housing body, a length direction of the adjustment hole is parallel to a surface of the light source plate, and the dial sheet portion passes through the adjustment hole and protrudes from an outer side wall of the housing body; a sliding hole is formed in the light source plate, a length direction of the sliding hole is parallel to the length direction of the adjustment hole, and the connecting portion protrudes from the sliding hole and can move in the sliding hole.

As an improvement to the above solution, a plurality of limiting notches are formed in an inner side wall of the sliding hole, the limiting notches are recessed towards an inner side of the sliding hole, edges of the limiting notches are arc-shaped, the plurality of limiting notches are distributed in the length direction of the sliding hole and connected to each other to form a wave shape, limiting bumps are provided at a side portion of the connecting portion, a shape of the limiting bump corresponds to a shape of the limiting notch, and the limiting bump can be snap-fitted into the limiting notch.

As an improvement to the above solution, the dial member further includes a guide rod, the guide rod is disposed at an end of the dial sheet portion located in the housing body, a shape of the guide rod corresponds to a shape of an inner side wall of the housing body, aside portion of the guide rod abuts against the inner side wall of the housing body, and the guide rod can slide along the inner side wall of the housing body.

As an improvement to the above solution, the contact member includes a second connecting plate and limiting plates, the limiting plates are disposed on two sides of the second connecting plate and protrude from the second connecting plate, and the connecting portion can be inserted between the two limiting plates.

As an improvement to the above solution, the contact member further includes a connecting sheet and a contact sheet; the second connecting plate and the connecting sheet are connected in a bending manner; the connecting sheet and the contact sheet are connected in a bending manner; a first movable contact and a second movable contact are provided on the contact sheet; the connecting contacts include a first fixed contact and a second fixed contact; when the first movable contact is in contact with the first fixed contact, the second movable contact is connected to the second fixed contact; and when the first movable contact is in contact with the second fixed contact, the second movable contact is in contact with the first fixed contact.

As an improvement to the above solution, the first fixed contact is disposed on aside of the sliding hole close to the hinge hole, and the second fixed contact is disposed on aside of the sliding hole away from the hinge hole; the first movable contact and the second movable contact are respectively disposed at two ends of the second connecting plate, the first movable contact can be in contact with the first fixed contact, and the second movable contact can be in contact with the second fixed contact.

As an improvement to the above solution, the first fixed contact and the second fixed contact are distributed on a same side of the sliding hole, and the first movable contact and the second movable contact are respectively disposed on two sides of a same end of the second connecting plate.

As an improvement to the above solution, the connecting portion is provided with a connecting hole, the contact member further includes an insertion portion, the second connecting plate and the insertion portion are connected in a bending manner, and the insertion portion can be inserted in the connecting hole.

As an improvement to the above solution, two sides of the insertion portion are each provided with a limiting sheet, the limiting sheet has one end connected to the insertion portion and the other end extending obliquely towards the second connecting plate and an outer side of the insertion portion, an inclined surface is provided in an opening at one end of the connecting hole, an inclination direction of the inclined surface is the same as an inclination direction of the limiting sheet, and one end of the limiting sheet can abut against an end of the connecting portion away from the inclined surface.

As an improvement to the above solution, the contact member further includes a fixing portion, the fixing portion is disposed between the second connecting plate and the insertion portion, a limiting boss is provided at a side portion of the fixing portion, and the limiting boss protrudes outwards and can abut against the inside of the connecting hole.

Implementing the present disclosure has the following beneficial effects:

The dial illumination lamp of the present disclosure is provided with a light source assembly and an adjustment assembly connected to the light source assembly. The light source assembly includes a light source plate and a light source provided on the light source plate. The light source outputs light outwards. To achieve dimming, the adjustment assembly includes a dial member and a contact member; the dial member has one end hinged to the light source plate; and the dial member can swing around a position where the light source plate is hinged to the dial member. Since the contact member is connected to the dial member, and the contact member abuts against the light source plate, the dial member in swinging drives the contact member to move. Connecting contacts are provided on the light source plate, the connecting contacts are connected to an external power supply device, and different connecting contacts can communicate power supply electrical loops at different gears. When moving, the contact member can slide between different connecting contacts, such that the connecting contacts are switched, and power supply gears are switched to achieve the effect of adjusting light exit parameters. The dial illumination lamp of the present disclosure achieves dimming by employing the dial member to switch the connections between the contact member and the connecting contacts. Compared with the connections between traditional wiring terminals and wiring base, the dial illumination lamp has the advantages of small volume, less occupied space, and simple structure, thereby facilitating space saving, and achieving miniaturization and integration of lamps.

DETAILED DESCRIPTION

Figure 1:
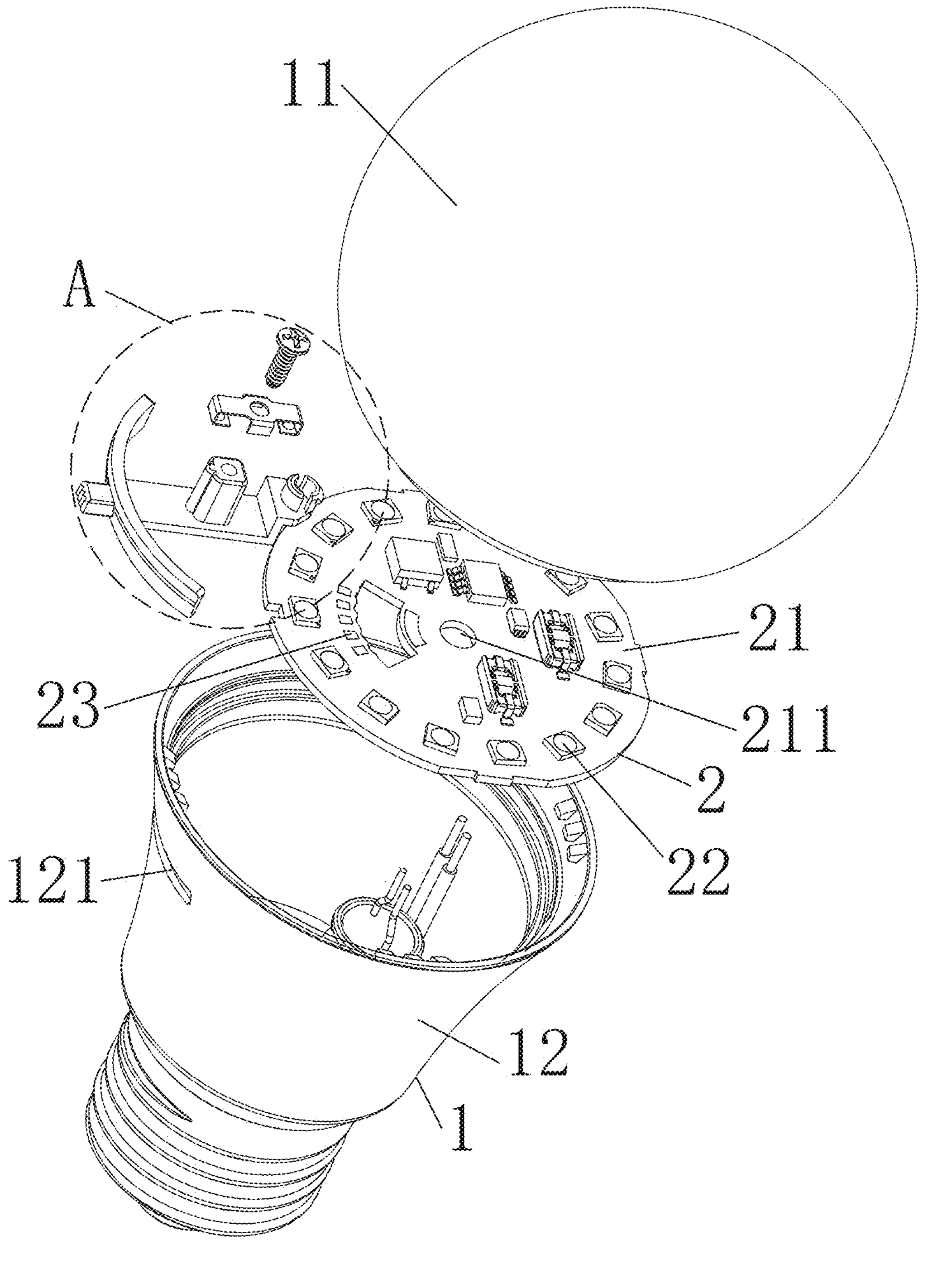
FIG. 1 is a schematic structural diagram of a first embodiment of a dial illumination lamp according to the present disclosure.

To make the objectives, technical solutions, and advantages of the present disclosure more clear, the present disclosure will be further described in detail below with reference to the accompanying drawings. It should be noted that orientation terms such as “upper”, “lower”, “left”, “right”, “front”, “rear”, “inner”, and “outer” that appear or are about to appear in the present disclosure are only based on the accompanying drawings of the present disclosure, and do not specifically limit the present disclosure.

Embodiments of the present disclosure disclose a dial illumination lamp, including a housing 1, a light source assembly 2 provided in the housing 1, and an adjustment assembly 10 connected to the light source assembly 2. The housing 1 includes a lampshade 11 and a housing body 12, and the housing 1 wraps and protects the light source assembly 2. The light source assembly 2 includes a light source plate 21 and a light source 22 provided on the light source plate 21. The light source plate 21 fixes the light source 22 and is electrically connected to the light source 22. The light source plate 21 is connected to the housing body 12, and the lampshade 11 scatters light and protects the light source assembly 2.

To adjust light exit parameters of the light source 22, the adjustment assembly 10 includes a dial member 3 and a contact member 4. The dial member 3 has one end hinged to the light source plate 21 and capable of rotating relative to the light source plate 21 and the other end capable of swinging relative to the light source plate 21 and the housing body 12. The contact member 4 is connected to the dial member 3. The dial member 3 in swinging drives the contact member 4 to move; the contact member 4 abuts against the light source plate 21; connecting contacts 23 are provided on the light source plate 21; and the contact member 4 can be in contact with the connecting contacts 23. There are a plurality of connecting contacts 23, which are respectively connected to different power supply circuits. When the contact member 4 is connected to the connecting contacts 23, the light source 22 is connected to different power supply circuits, and different power supply circuits are at different gears. The dial member 3 can swing around a position where the light source plate 21 is hinged to the dial member 3. The dial member 3 in swinging drives the contact member 4 to slide between different connecting contacts 23, such that the light source 22 is connected to different power supply circuits to switch gears of power supply currents, thereby adjusting light exit parameters.

The embodiments of the present disclosure have the following beneficial effects:

The dial illumination lamp in embodiments of the present disclosure is provided with a light source assembly 2 and an adjustment assembly 10 connected to the light source assembly 2. The light source assembly 2 includes a light source plate 21 and a light source 22 provided on the light source plate 21. The light source 22 outputs light outwards. To achieve dimming, the adjustment assembly 10 includes a dial member 3 and a contact member 4; the dial member 3 has one end hinged to the light source plate 21; and the dial member 3 can swing around a position where the light source plate 21 is hinged to the dial member 3. Since the contact member 4 is connected to the dial member 3, and the contact member 4 abuts against the light source plate 21, the dial member 3 in swinging drives the contact member 4 to move. Connecting contacts 23 are provided on the light source plate 21, the connecting contacts 23 are connected to an external power supply device, and different connecting contacts 23 can communicate power supply electrical loops at different gears. When moving, the contact member 4 can slide between different connecting contacts 23, such that the connecting contacts 23 are switched, and power supply gears are switched to achieve the effect of adjusting light exit parameters. The dial illumination lamp of the present disclosure achieves dimming by employing the dial member 3 to switch the connections between the contact member 4 and the connecting contacts 23. Compared with the connections between traditional wiring terminals and wiring base, the dial illumination lamp has the advantages of small volume, less occupied space, and simple structure, thereby facilitating space saving, and achieving miniaturization and integration of lamps.

In the embodiments of the present disclosure, the contact member 4 is an elastic sheet, and the elastic sheet has the ability to deform and recover and can be deformed after being subjected to a certain degree of external force and return to its original shape. Moreover, to facilitate electrical conductivity, the used elastic sheet is a metal elastic sheet. The elastic sheet serves as the contact member 4, such that the overall structure can be simplified, the mounting space and the usage space are saved, it is convenient for the elastic sheet to generate continuous and stable contact with the connecting contacts 23 by using the ability to recover, and it is convenient for the elastic sheet to switch between different connecting contacts 23 by using the ability to deform.

In different embodiments, the contact member 4 may be connected to the dial member 3 through a fastener 5, and the fastener 5 may be a part such as a screw, a bolt, a latch, and a pin, and may also be connected to the dial member 3 in an insertion manner. The contact member 4 is provided with sliding contacts (441, 442), and the sliding contacts (441, 442) can be in contact with the connecting contacts 23. The contact member 4 can be electrically conductive as a whole, so different power supply loops can be switched by sliding the sliding contacts (441, 442) between different connecting contacts 23.

When the contact member 4 is fixed to the dial member 3 through the fastener 5, there are two sliding contacts (441, 442), and the two sliding contacts (441, 442) are respectively disposed on two sides of the fastener 5, or the sliding contacts (441, 442) are both disposed on a same side of the fastener 5. The two sliding contacts (441, 442) are respectively disposed on two sides or the same side of the fastener 5, and both can make full use of the surface space of the light source plate to achieve the effect of space saving.

When the contact member 4 is inserted into the dial member 3, a connecting hole 342 is formed in the dial member 3, and during mounting, the contact member 4 is inserted into the connecting hole 342, such that the structure is simple, and the mounting is convenient. There are two sliding contacts (441, 442), and the two sliding contacts (441, 442) are disposed on a same side of the connecting hole 342.

Figure 2:
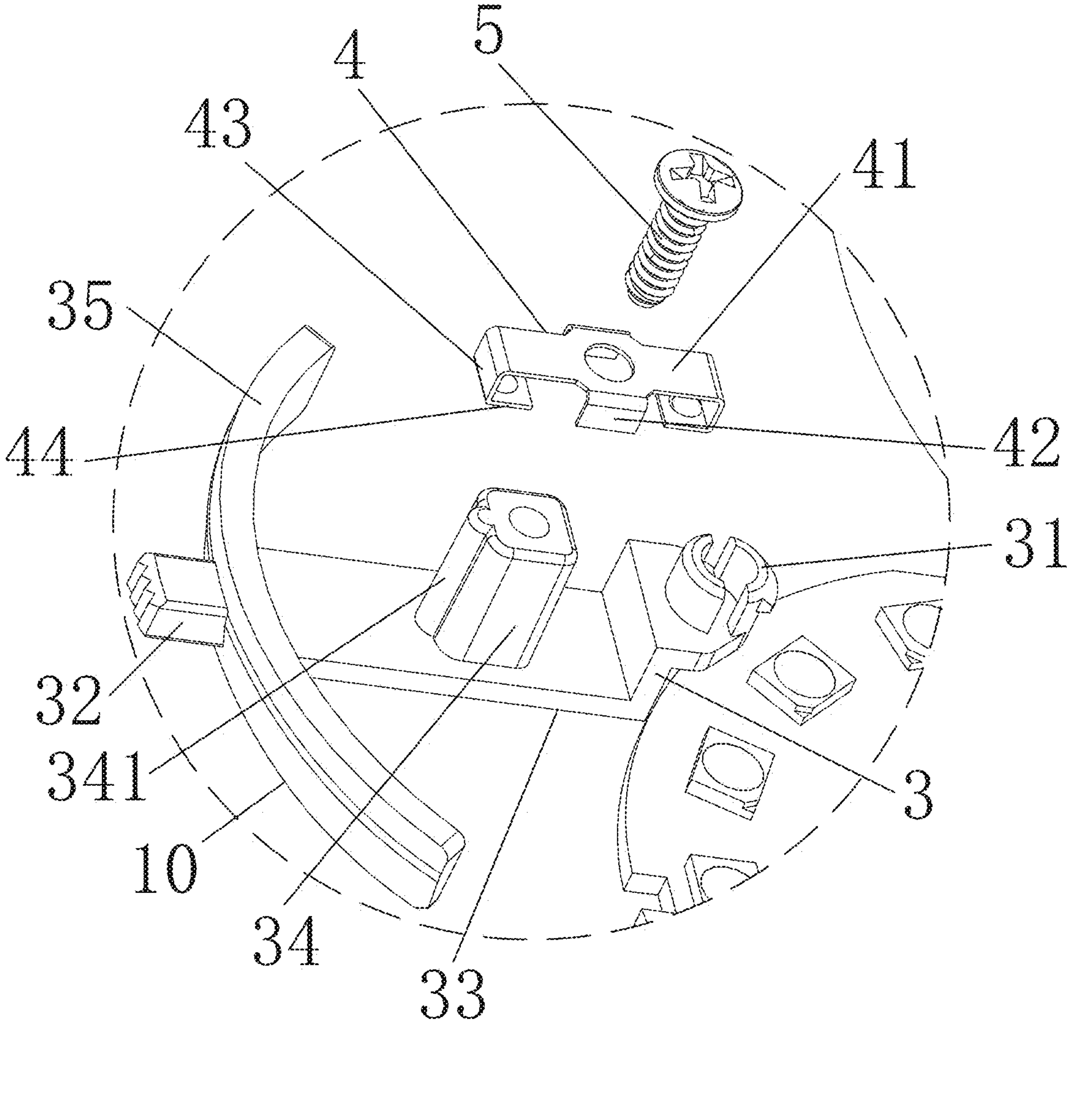
FIG. 2 is a partial enlarged view of A in FIG. 1.
Figure 3:
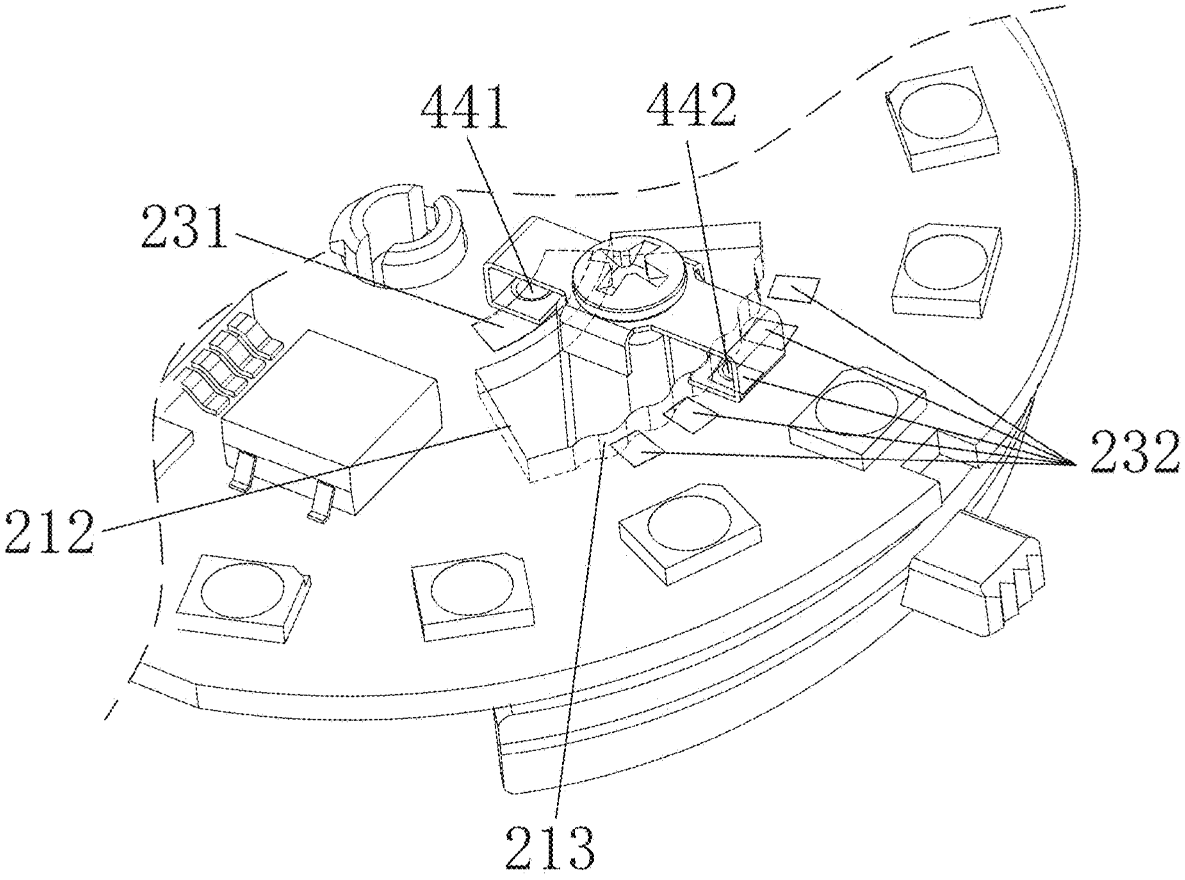
FIG. 3 is a schematic diagram of a partial structure of a first embodiment of an adjustment assembly according to the present disclosure.

Specifically, FIG. 1 to FIG. 3 disclose the first embodiment of the present disclosure. In the first embodiment, a hinge portion 31 is provided at one end of the dial member 3, the hinge portion 31 is cylindrical, a dial sheet portion 32 is provided at the other end of the dial member 3, a hinge hole 211 is formed in the light source plate 21, the hinge portion 31 can be inserted into the hinge hole 211, the hinge hole 211 is a round hole, the hinge portion 31 can rotate relative to the hinge hole 211, and the dial sheet portion 32 can swing around the hinge hole 211. A clamping bump 311 is provided at an end part of the hinge portion 31, the clamping bump 311 protrudes from a side wall of the hinge portion 31 and abuts against the light source plate 21, and the clamping bump 311 can provide limiting in the vertical direction for the connection between the hinge portion 31 and the hinge hole 211. The dial sheet portion 32 protrudes towards the outer side of the housing body 12, such that the dial sheet portion 32 is conveniently operated. During use, the dial sheet portion 32 is pushed, such that the dial member 3 can swing around the hinge portion 31 to drive the contact member 4.

With reference to FIG. 2, the dial member 3 further includes a first connecting plate 33 and a connecting portion 34, the first connecting plate 33 is connected between the hinge portion 31 and the dial sheet portion 32, the connecting portion 34 protrudes from the first connecting plate 33 and passes through the light source plate 21, and when the dial member 3 is pushed, the connecting portion 34 moves relative to the light source plate 21, the contact member 4 is connected to the connecting portion 34, and the contact member 4 can move with the connecting portion 34.

With reference to FIG. 3, an adjustment hole 121 is formed in a side wall of the housing body 12, the adjustment hole 121 is a long hole, and a length direction of the adjustment hole 121 is parallel to the surface of the light source plate 21. The dial sheet portion 32 passes through the adjustment hole 121 and protrudes from the outer side wall of the housing body 12, and therefore, during adjustment, the dial sheet portion 32 is shifted to move in the adjustment hole 121. Since the length direction of the adjustment hole 121 is parallel to the surface of the light source plate 21, the movement direction of the dial sheet portion 32 and the connecting portion 34 is parallel to the surface of the light source plate 21. A sliding hole 212 is formed in the light source plate 21, and a length direction of the sliding hole 212 is parallel to a length direction of the adjustment hole 121. That is, the projection of an extension trajectory of the sliding hole 212 on a plane where the adjustment hole 121 is located does not overlap an extension trajectory of the adjustment hole 121. The sliding hole 212 and the adjustment hole 121 are both parallel to the surface of the light source plate 21. The connecting portion 34 protrudes from the sliding hole 212 and can move in the sliding hole 212. Therefore, the connecting portion 34 can make full use of the surface space of the light source plate 21 to move, without occupying additional movement space, such that the overall volume of the adjustment assembly 10 can be reduced.

With reference to FIG. 3, to limit the adjusted gear and improve the operation feel of adjustment, a plurality of limiting notches 213 are formed in an inner side wall of the sliding hole 212, the limiting notches 213 are recessed towards an inner side of the sliding hole 212, edges of the limiting notches 213 are arc-shaped, the plurality of limiting notches 213 are distributed in the length direction of the sliding hole 212 and connected to each other to form a wave shape, each limiting notch 213 moves to a position on each gear corresponding to the connecting portion 34, limiting bumps 341 are provided at a side portion of the connecting portion 34, a shape of the limiting bump 341 corresponds to a shape of the limiting notch 213, and each time the limiting bump 341 moves by a gear, the limiting bump 341 can be snap-fitted into the limiting notch 213 at the corresponding gear. After a user switches a gear by using the dial member 3, the limiting bump 341 can be snap-fitted into the limiting notch 213 at the corresponding gear, which not only limits the limiting bump 341 to prevent the connecting portion 34 from moving too much or too little to cause a short circuit or poor contact, but also provides vibration feedback and sound feedback to the user's operation after successfully switching the gears, thereby improving the feel of use and enhancing user experience.

With reference to FIG. 1, to guide the movement of the dial member 3 and avoid jamming and tripping, the dial member 3 further includes a guide rod 35, the guide rod 35 is disposed at an end of the dial sheet portion 32 located in the housing body 12, a shape of the guide rod 35 corresponds to a shape of an inner side wall of the housing body 12, and therefore a side portion of the guide rod 35 can abut against the inner side wall of the housing body 12. When the dial member 3 is shifted to drive the contact member 4 to move, the guide rod 35 can slide along the inner side wall of the housing body 12. The guide rod 35 and the housing body 12 interact to limit the movement trajectory of the dial member 3, such that the dial member 3 can move only along the inner side wall of the housing body 12. Specifically, the movement direction of the dial member 3 is a horizontal direction, the inner side wall of the housing body 12 is an arc-shaped surface, the dial member 3 can swing in the horizontal direction around the central axis of the housing body 12, and the guide rod 35 ensures the swing height and direction of the dial member 3.

With reference to FIG. 2, the contact member 4 includes a second connecting plate 41 and limiting plates 42, the limiting plates 42 are disposed on two sides of the second connecting plate 41 and protrude from the second connecting plate 41, and in the first embodiment, the second connecting plate 41 is fixed to the connecting portion 34 through a fastener 5 such as a screw. During mounting, the second connecting plate 41 is fixed to the connecting portion 34 through a fastener 5 such as a screw. Moreover, the connecting portion 34 can be inserted between the two limiting plates 42. The fastener 5 forms limiting in the vertical direction for the contact member 4, and the limiting plates 42 and the connecting portion 34 cooperate to form limiting in the horizontal direction for the contact member 4, such that the contact member 4 can stably move with the connecting portion 34, and the angle offset generated by the connecting portion 34 during swinging can also be transferred into the contact member 4.

With reference to FIG. 2, the contact member 4 further includes a connecting sheet 43 and a contact sheet 44; the second connecting plate 41 and the connecting sheet 43 are connected in a bending manner; and the connecting sheet 43 and the contact sheet 44 are connected in a bending manner. Through mutual connection in a bending manner, there is a certain elasticity between the second connecting plate 41 and the contact sheet 44, such that a pre-tightening force can be generated between the contact sheet 44 and the connecting contacts 23, and the contact sheet 44 can loosen the current connecting contact 23 to move to the next connecting contact 23. Specifically, the sliding contacts (441, 442) are disposed on the contact sheet 44, the sliding contacts (441, 442) include a first movable contact 441 and a second movable contact 442, and the first movable contact 441 and the second movable contact 442 are electrically conductive with each other. The connecting contacts 23 include a first fixed contact 231 and a second fixed contact 232, the first fixed contact 231 and the second fixed contact 232 are isolated from each other, and the first fixed contact 231 and the second fixed contact 232 are connected to electrical loops at the same gear. The first fixed contact 231 and the second fixed contact 232 form a normally open switch of the electrical loop, and the first movable contact 441 and the second movable contact 442 can be respectively in contact with the first fixed contact 231 and the second fixed contact 232, such that the normally open switch is turned on to form an energizing loop to supply power to the light source 22. The number of first fixed contacts 231 and the number of second fixed contacts 232 are not necessarily equal. By reasonably setting the distance between the first movable contact 441 and the second movable contact 442, when the first movable contact 441 is in contact with the first fixed contact 231, the second movable contact 442 is connected to the second fixed contact 232, and when the first movable contact 441 is in contact with the second fixed contact 232, the second movable contact 442 is connected to the first fixed contact 231.

With reference to FIG. 3, in the first embodiment, there is one first fixed contact 231, and there are a plurality of second fixed contacts 232. The first fixed contact 231 is disposed on aside of the sliding hole 212 close to the hinge hole 211, and the second fixed contacts 232 are disposed on aside of the sliding hole 212 away from the hinge hole 211. The length of the first fixed contact 231 is greater than that of each second fixed contact 232 and less than the total length of all the second fixed contacts 232. The first fixed contact 231 is disposed on the side of the sliding hole 212 close to the hinge hole 211, such that the first movable contact 441 can be continuously in contact with the first fixed contact 231 in the movement process. Specifically, the first movable contact 441 and the second movable contact 442 are respectively disposed at two ends of the second connecting plate 41, the first movable contact 441 is disposed at the end of the second connecting plate 41 close to the hinge hole 211, and the second movable contact 442 is disposed at the end of the second connecting plate 41 away from the hinge hole 211. Through separate arrangement at two ends, when the dial member 3 swings, the movement path of the first movable contact 441 is less than the path of the second movable contact 442, and the first movable contact 441 can be continuously in contact with the first fixed contacts 231. The movement path of the first movable contact 441 is arc-shaped, and the distribution shape of the first fixed contact 231 is also arc-shaped. The second movable contact 442 can be switched between the plurality of second fixed contacts 232 for making contact. Each time a second fixed contact 232 is switched, a gear is switched. In other embodiments, there may also be a plurality of first fixed contacts 231. The plurality of first fixed contacts 231 are disposed on the side of the sliding hole 212 close to the hinge hole 211, and at this time, the first fixed contacts 231 are non-arc-shaped. The length of each first fixed contact 231 is less than or equal to the length of each second fixed contact 232. The first movable contact 441 can be switched between the plurality of first fixed contacts 231.

The first fixed contact 231 and the second fixed contact 232 are respectively disposed on two sides of the sliding hole 212, and the first movable contact 441 and the second movable contact 442 are disposed at two ends of the second connecting plate 41. Moreover, the second connecting plate 41 extends towards the hinge hole 211. The surface space of the light source plate 21 can be used as much as possible for mounting and operation, such that the space can be saved, and miniaturization and integration of lamps are facilitated.

Figure 4:
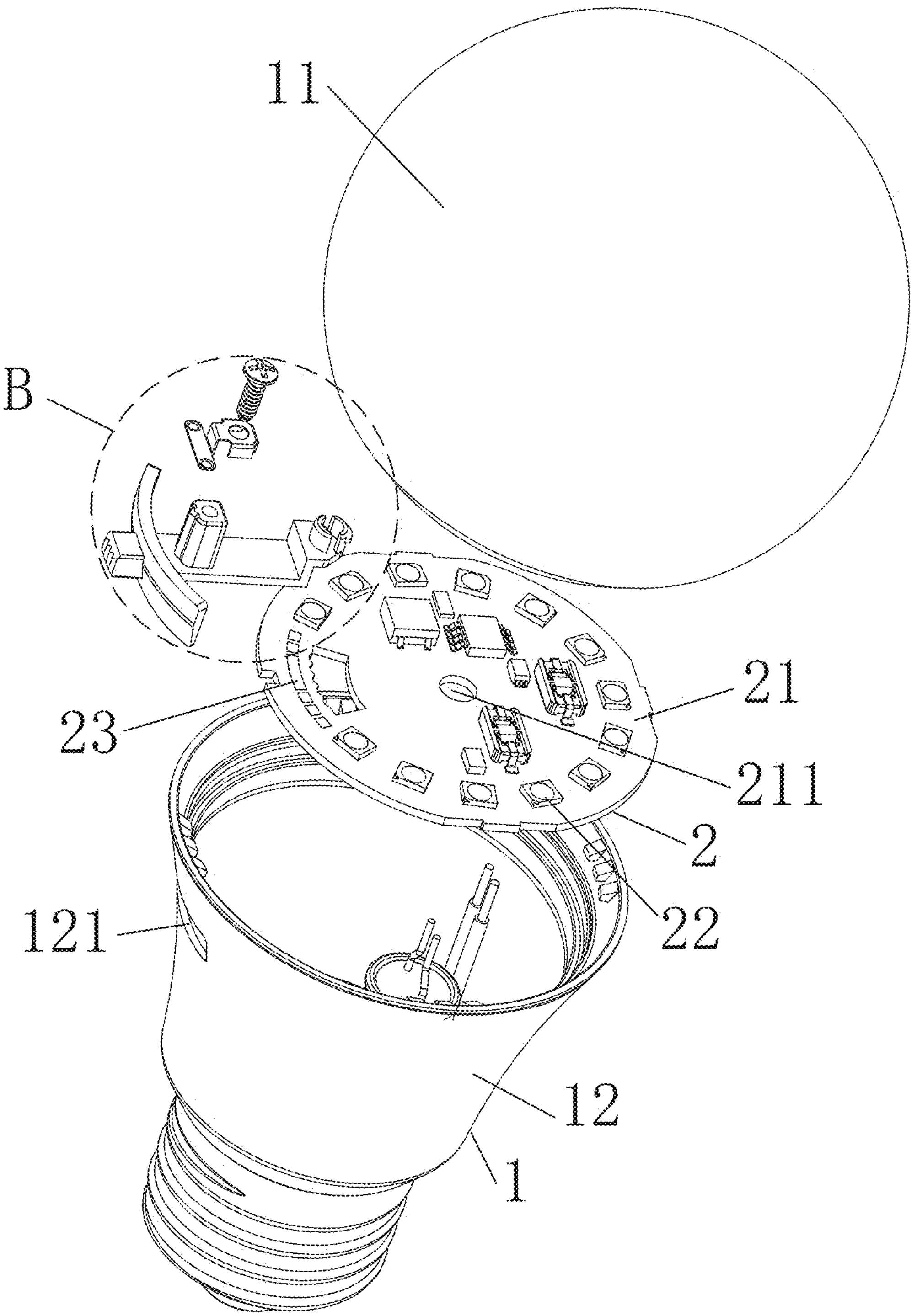
FIG. 4 is a schematic structural diagram of a second embodiment of a dial illumination lamp according to the present disclosure.
Figure 5:
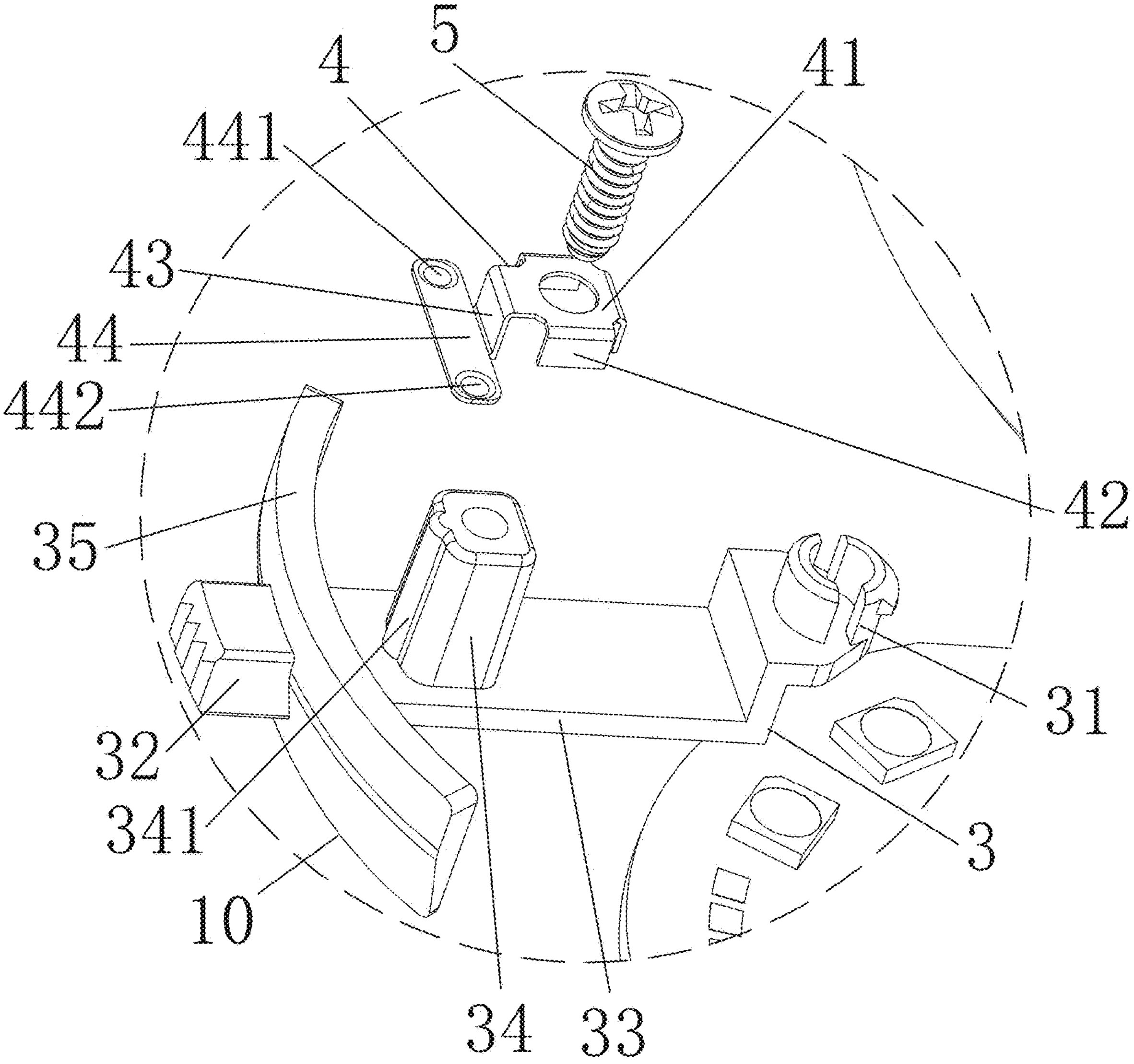
FIG. 5 is a partial enlarged view of A in FIG. 4.
Figure 6:
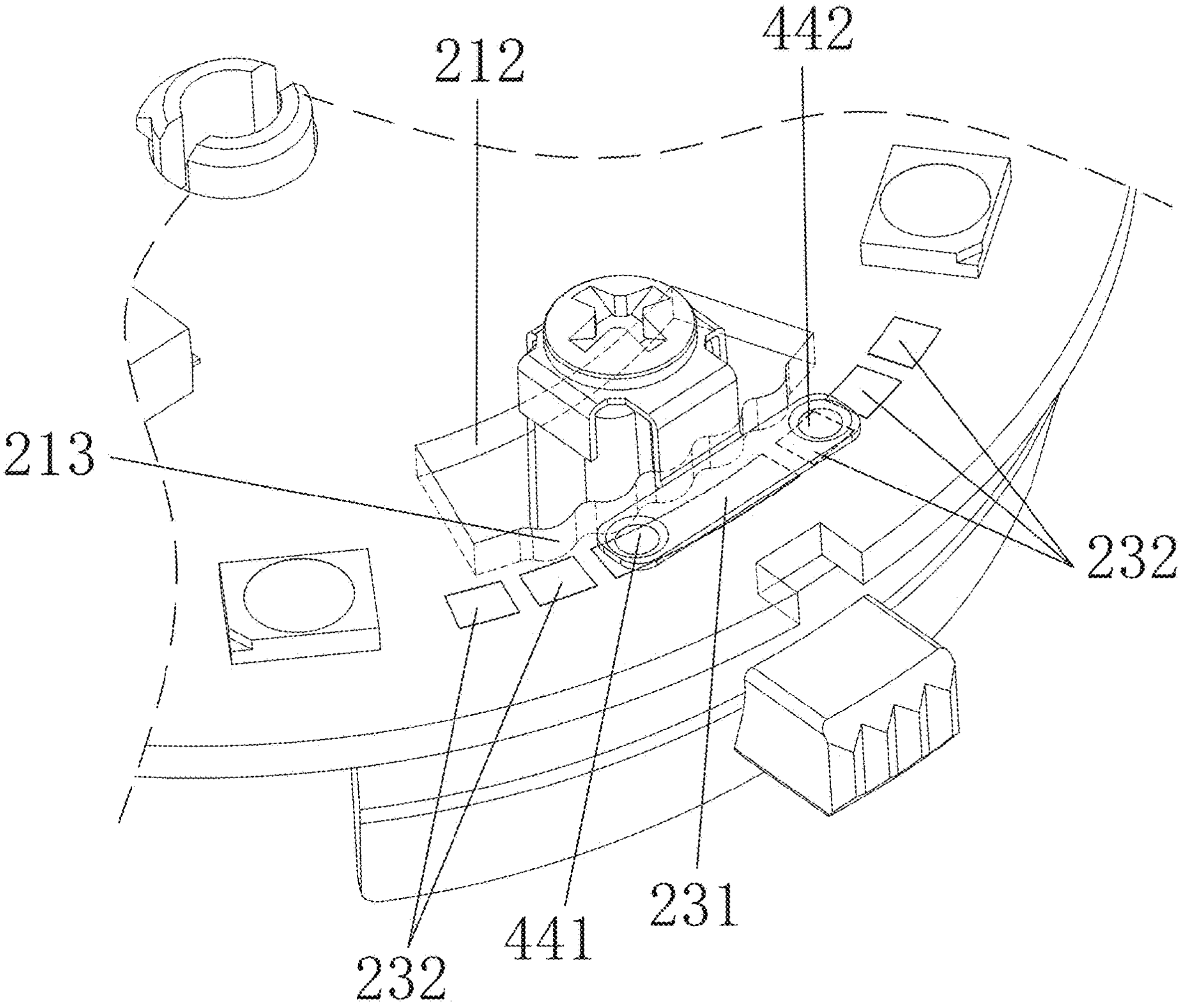
FIG. 6 is a schematic diagram of a partial structure of a second embodiment of an adjustment assembly according to the present disclosure.
Figure 7:
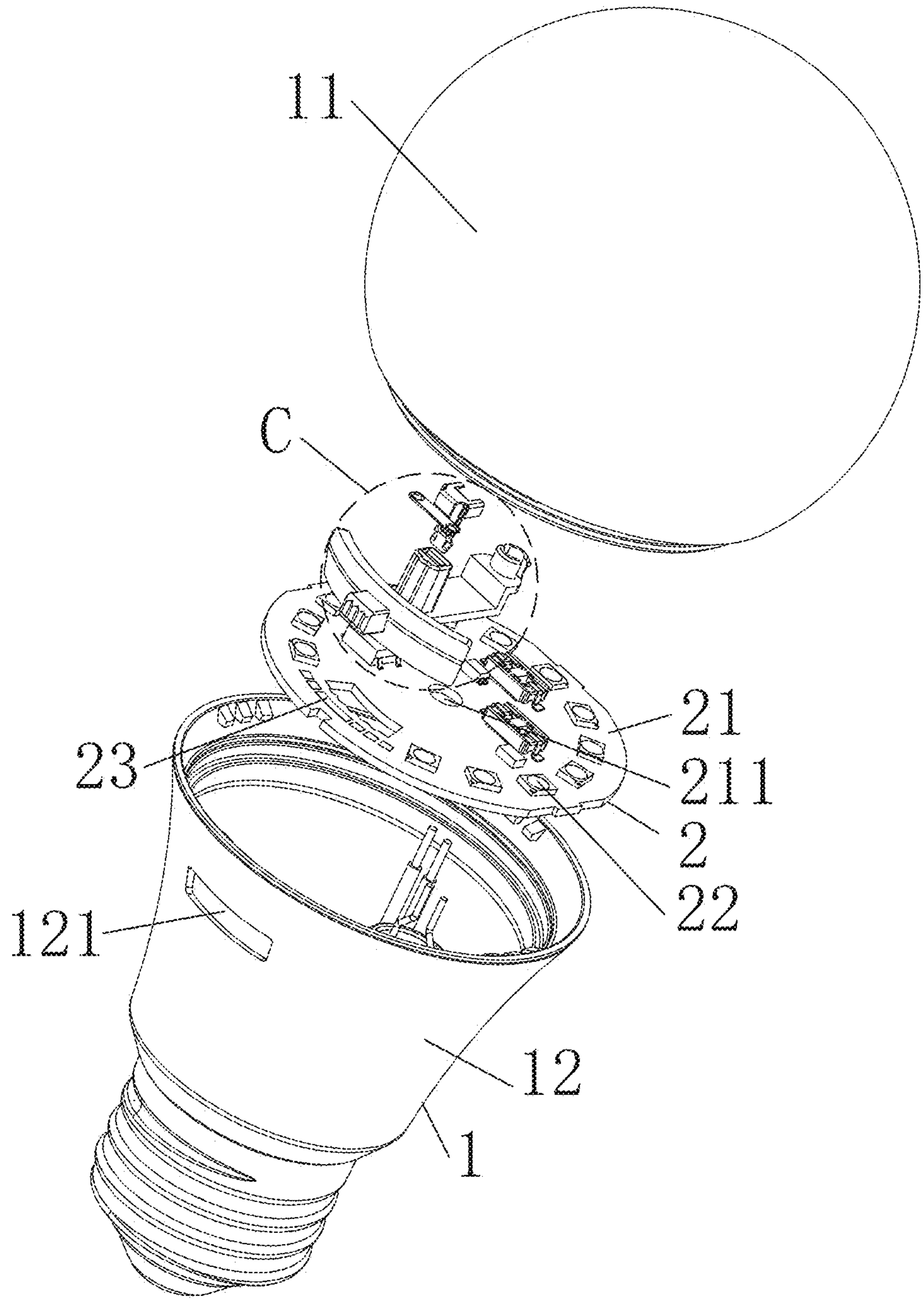
FIG. 7 is a schematic structural diagram of a third embodiment of a dial illumination lamp according to the present disclosure.

FIG. 4 to FIG. 6 disclose the second embodiment of the present disclosure. The second embodiment differs from the first embodiment in that: the first fixed contact 231 and the second fixed contact 232 are distributed on a same side of the sliding hole 212. A single first fixed contact 231 and a single second fixed contact 232 form a switch of a group of normally open circuits. Therefore, a plurality of groups of normally open circuit switches are provided on the light source plate 21. The first movable contact 441 and the second movable contact 442 are respectively disposed on two sides of a same end of the second connecting plate 31. When the contact member 4 moves, the first movable contact 441 and the second movable contact 442 can be in contact with the first fixed contact 231 and the second fixed contact 232 to turn on the normally open circuit formed by the first fixed contact 231 and the second fixed contact 232. The first fixed contact 231 and the second fixed contact 232 can move to different normally open circuits to turn on the circuits, thereby switching the gears. The number of first fixed contacts 231 and the number of second fixed contacts 232 are not necessarily equal. By reasonably setting the distance between the first movable contact 441 and the second movable contact 442, when the first movable contact 441 is in contact with the first fixed contact 231, the second movable contact 442 is connected to the second fixed contact 232, and when the first movable contact 441 is in contact with the second fixed contact 232, the second movable contact 442 is connected to the first fixed contact 231.

The first fixed contact 231 and the second fixed contact 232 are distributed on the same side of the sliding hole 212, such that the radial span of the adjustment assembly 10 on the light source plate 21 can be shortened, the large space at the edge part of the light source plate 21 can be used to the greatest extent, and the effects of reducing the volume and saving the operation space are achieved.

FIG. 7 to FIG. 10 disclose the third embodiment of the present disclosure. The third embodiment differs from the first embodiment in that: the contact member 4 is connected to the connecting portion 34 in an insertion manner. Moreover, the distribution modes of the first fixed contact 231, the second fixed contact 232, the first movable contact 441, and the second movable contact 442 are the same as those in the second embodiment.

Figure 8:
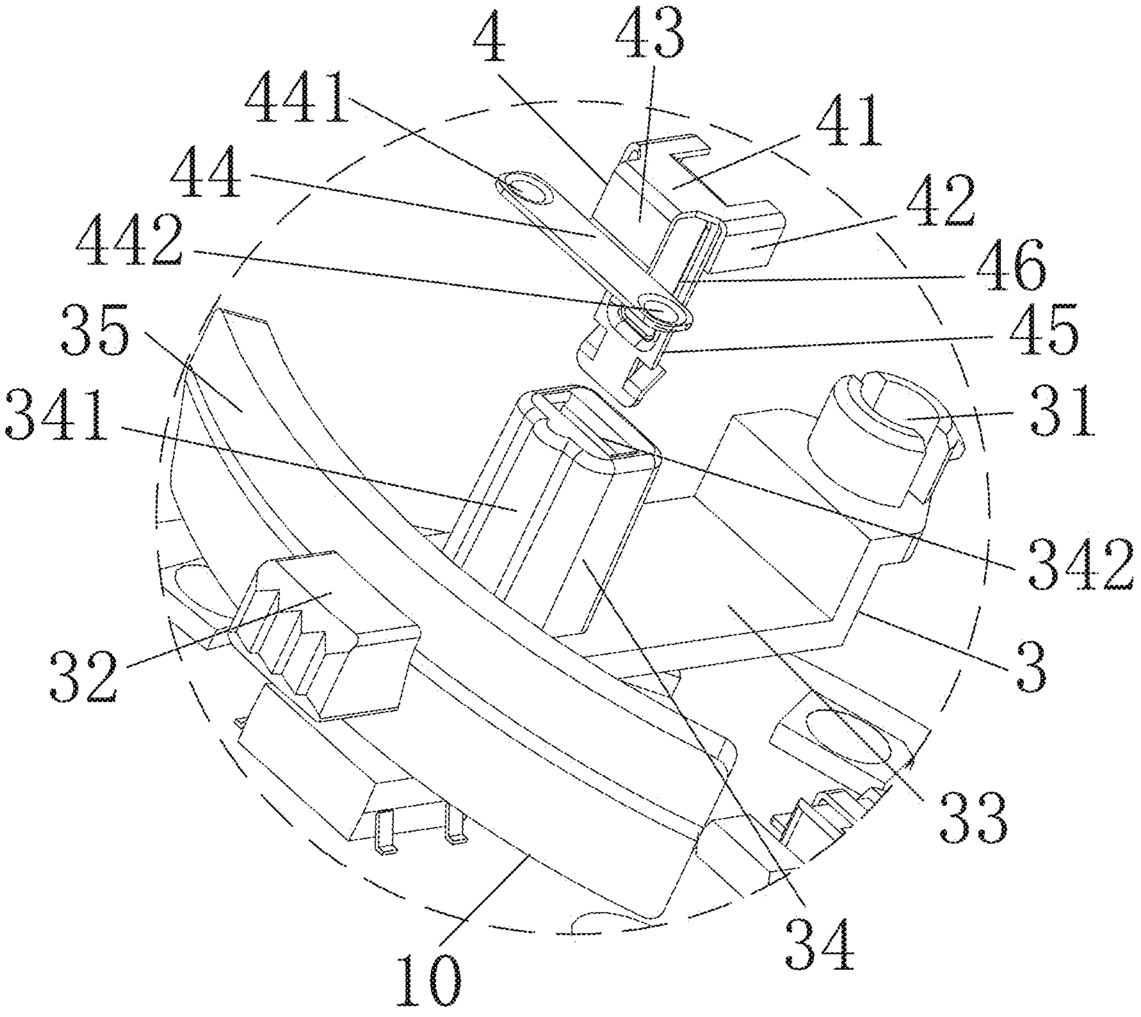
FIG. 8 is a partial enlarged view of A in FIG. 7.
Figure 9:
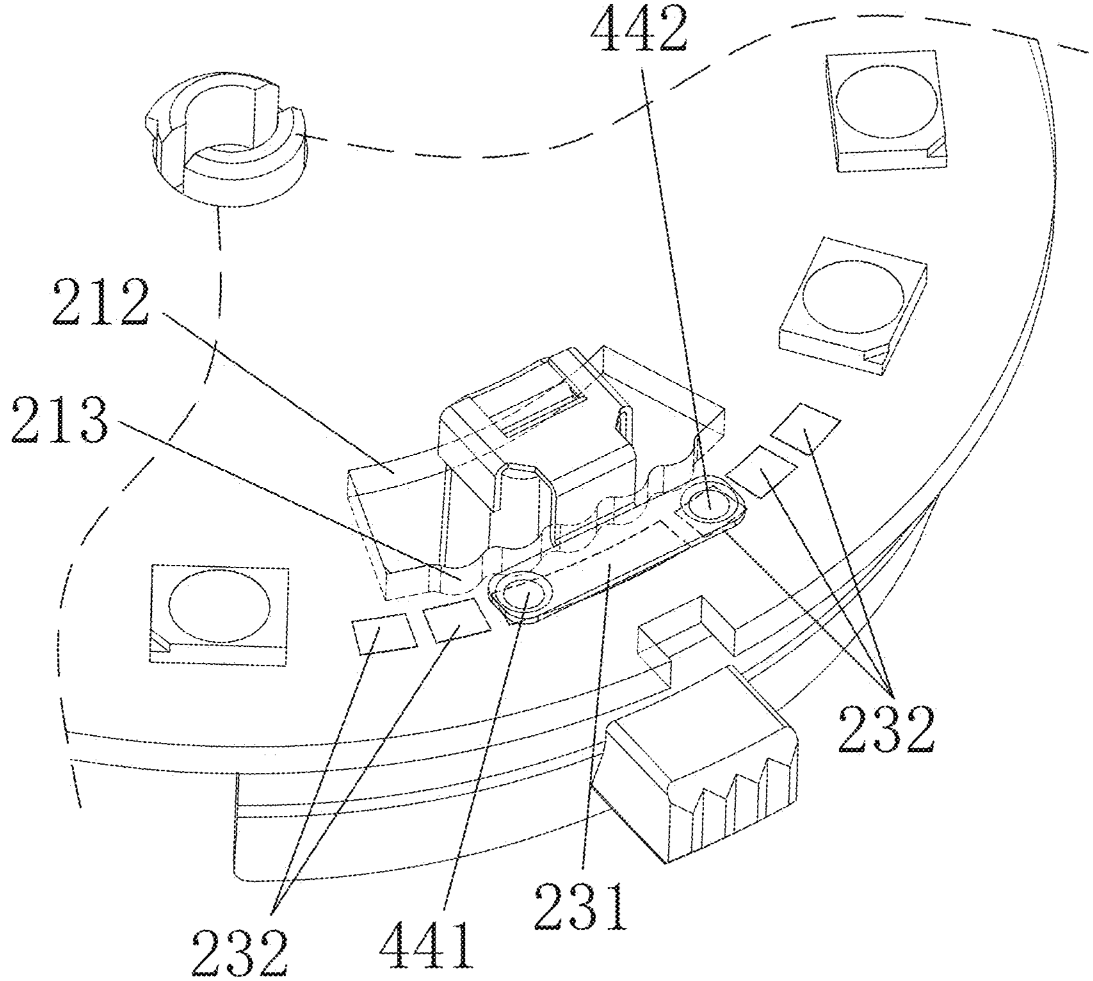
FIG. 9 is a schematic diagram of a partial structure of a third embodiment of an adjustment assembly according to the present disclosure.

Specifically, as shown in FIG. 8, the connecting portion 34 is provided with a connecting hole 342, and the connecting hole 342 passes through the connecting portion 34. The contact member 4 further includes an insertion portion 45, the second connecting plate 41 and the insertion portion 45 are connected in a bending manner, and the insertion portion 45 can be inserted in the connecting hole 342. The second connecting plate 41 is fixed to the surface of the connecting portion 34.

Figure 10:
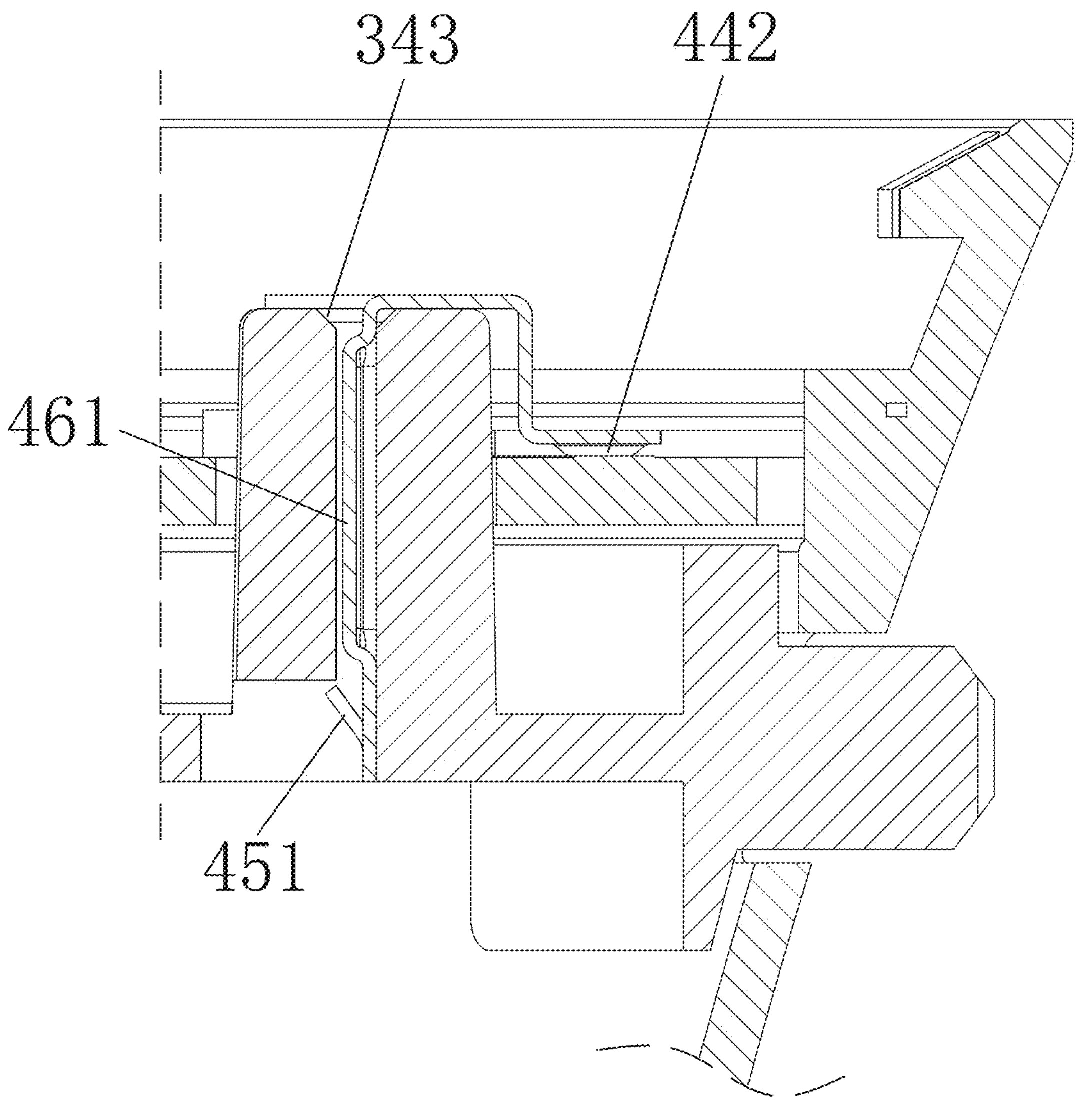
FIG. 10 is a schematic diagram of a local sectional structure of a third embodiment of a dial illumination lamp according to the present disclosure.

With reference to FIG. 10, to fix the insertion portion 45, two sides of the insertion portion 45 are each provided with a limiting sheet 451, and the limiting sheet 451 has one end connected to the insertion portion 45 and the other end extending obliquely towards the second connecting plate 41 and an outer side of the insertion portion 45. The insertion portion 45 is inserted into the connecting hole 342 to form connection. The limiting sheet 451 can form clamping with the connecting hole 342. An inclined surface 343 is provided in an opening at one end of the connecting hole 342, an inclination direction of the inclined surface 343 is the same as an inclination direction of the limiting sheet 451. After the insertion portion 45 is inserted into the connecting hole 342, one end of the limiting sheet 451 can abut against an end of the connecting portion 34 away from the inclined surface 343 to prevent the insertion portion 45 from escaping, and therefore the limiting sheet 451 and the connecting hole 342 can form limiting in the vertical direction. The inclined surface 343 can conveniently extrude the limiting sheet 451 to reduce the inclination degree of the limiting sheet 451, such that the insertion portion 45 is conveniently inserted into the connecting hole 342 as a whole. The contact member 4 further includes a fixing portion 46, and the fixing portion 46 is disposed between the second connecting plate 41 and the insertion portion 45. After the insertion portion 45 is inserted into the connecting hole 342, a limiting boss 461 is provided at a side portion of the fixing portion 46, the limiting boss 461 protrudes outwards and can abut against the inside of the connecting hole 342, and therefore the limiting boss 461 and the connecting hole 342 form limiting in the horizontal direction.

In the third embodiment, the first fixed contact 231 and the second fixed contact 232 are distributed on the same side of the sliding hole 212. A single first fixed contact 231 and a single second fixed contact 232 form a switch of a group of normally open circuits. Therefore, a plurality of groups of normally open circuit switches are provided on the light source plate 21. The first movable contact 441 and the second movable contact 442 are disposed on a same end of the second connecting plate 41. When the contact member 4 moves, the first movable contact 441 and the second movable contact 442 can be in contact with the first fixed contact 231 and the second fixed contact 232 to turn on the normally open circuit formed by the first fixed contact 231 and the second fixed contact 232. The first fixed contact 231 and the second fixed contact 232 can move to different normally open circuits to turn on the circuits, thereby switching the gears. By reasonably setting the distance between the first movable contact 441 and the second movable contact 442, when the first movable contact 441 is in contact with the first fixed contact 231, the second movable contact 442 is connected to the second fixed contact 232, and when the first movable contact 441 is in contact with the second fixed contact 232, the second movable contact 442 is connected to the first fixed contact 231. What is the same as in the second embodiment: the first fixed contact 231 and the second fixed contact 232 are distributed on the same side of the sliding hole 212, such that the radial span of the adjustment assembly 10 on the light source plate 21 can be shortened, the large space at the edge part of the light source plate 21 can be used to the greatest extent, and the effects of reducing the volume and saving the operation space are achieved.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

The invention claimed is:

1. A dial illumination lamp, comprising a housing, a light source assembly provided in the housing, and an adjustment assembly connected to the light source assembly, wherein the housing comprises a housing body; the light source assembly comprises a light source plate and a light source provided on the light source plate; the light source plate is connected to the housing body;

wherein the adjustment assembly comprises a dial member and a contact member; the dial member has one end hinged to the light source plate; the contact member is connected to the dial member; the contact member abuts against the light source plate; connecting contacts are provided on the light source plate; the contact member is configured for being in contact with the connecting contacts; the dial member is configured for swinging around a position where the light source plate is hinged to the dial member; and the dial member in swinging drives the contact member to slide between the different connecting contacts; and wherein a hinge portion is provided at one end of the dial member, a dial sheet portion is provided at the other end of the dial member, a hinge hole is formed in the light source plate, the hinge portion is configured for being inserted into the hinge hole, a clamping bump is provided at an end part of the hinge portion, the clamping bump protrudes from a side wall of the hinge portion and abuts against the light source plate, the dial sheet portion is configured for swinging around the hinge hole, and the dial sheet portion protrudes towards an outer side of the housing body.

2. The dial illumination lamp according to claim 1, wherein the contact member is an elastic sheet, and the contact member is connected to the dial member through a fastener, or the contact member is inserted on the dial member.

3. The dial illumination lamp according to claim 2, wherein the contact member is provided with sliding contacts, and the sliding contacts are configured for being in contact with the connecting contacts.

4. The dial illumination lamp according to claim 3, wherein there are two sliding contacts, and the two sliding contacts are respectively disposed on two sides of the fastener, or the sliding contacts are both disposed on a same side of the fastener.

5. The dial illumination lamp according to claim 3, wherein a connecting hole is formed in the dial member, and the contact member is inserted into the connecting hole.

6. The dial illumination lamp according to claim 5, wherein there are two sliding contacts, and the two sliding contacts are disposed on a same side of the connecting hole.

7. The dial illumination lamp according to claim 1, wherein the dial member further comprises a first connecting plate and a connecting portion, the first connecting plate is connected between the hinge portion and the dial sheet portion, the connecting portion protrudes from the first connecting plate, and the contact member is connected to the connecting portion.

8. The dial illumination lamp according to claim 7, wherein an adjustment hole is formed in a side wall of the housing body, a length direction of the adjustment hole is parallel to a surface of the light source plate, and the dial sheet portion passes through the adjustment hole and protrudes from an outer side wall of the housing body; a sliding hole is formed in the light source plate, a length direction of the sliding hole is parallel to the length direction of the adjustment hole, and the connecting portion protrudes from the sliding hole and is configured for capable of moving in the sliding hole.

9. The dial illumination lamp according to claim 8, wherein a plurality of limiting notches are formed in an inner side wall of the sliding hole, the limiting notches are recessed towards an inner side of the sliding hole, edges of the limiting notches are arc-shaped, the plurality of limiting notches are distributed in the length direction of the sliding hole and connected to each other to form a wave shape, limiting bumps are provided at a side portion of the connecting portion, a shape of the limiting bump corresponds to a shape of the limiting notch, and the limiting bump is configured for being snap-fitted into the limiting notch.

10. The dial illumination lamp according to claim 8, wherein the dial member further comprises a guide rod, the guide rod is disposed at an end of the dial sheet portion located in the housing body, a shape of the guide rod corresponds to a shape of an inner side wall of the housing body, aside portion of the guide rod abuts against the inner side wall of the housing body, and the guide rod is configured for sliding along the inner side wall of the housing body.

11. The dial illumination lamp according to claim 8, wherein the contact member comprises a second connecting plate and two limiting plates, the two limiting plates are respectively disposed on two sides of the second connecting plate and protrude from the second connecting plate, and the connecting portion is configured for being inserted between the two limiting plates.

12. The dial illumination lamp according to claim 11, wherein the contact member further comprises a connecting sheet and a contact sheet; the second connecting plate and the connecting sheet are connected in a bending manner; the connecting sheet and the contact sheet are connected in a bending manner; a first movable contact and a second movable contact are provided on the contact sheet; the connecting contacts comprise a first fixed contact and a second fixed contact; when the first movable contact is in contact with the first fixed contact, the second movable contact is connected to the second fixed contact; and when the first movable contact is in contact with the second fixed contact, the second movable contact is in contact with the first fixed contact.

13. The dial illumination lamp according to claim 12, wherein the first fixed contact is disposed on a side of the sliding hole close to the hinge hole, and the second fixed contact is disposed on aside of the sliding hole away from the hinge hole; the first movable contact and the second movable contact are respectively disposed at two ends of the second connecting plate, the first movable contact is configured for being in contact with the first fixed contact, and the second movable contact is configured for being in contact with the second fixed contact.

14. The dial illumination lamp according to claim 12, wherein the first fixed contact and the second fixed contact are distributed on a same side of the sliding hole, and the first movable contact and the second movable contact are respectively disposed on two sides of a same end of the second connecting plate.

15. The dial illumination lamp according to claim 14, wherein the connecting portion is provided with a connecting hole, the contact member further comprises an insertion portion, the second connecting plate and the insertion portion are connected in a bending manner, and the insertion portion is configured for being inserted in the connecting hole.

16. The dial illumination lamp according to claim 15, wherein two sides of the insertion portion are each provided with a limiting sheet, the limiting sheet has one end connected to the insertion portion and the other end extending obliquely towards the second connecting plate and an outer side of the insertion portion, an inclined surface is provided in an opening at one end of the connecting hole, an inclination direction of the inclined surface is the same as an inclination direction of the limiting sheet, and one end of the limiting sheet is configured for abutting against an end of the connecting portion away from the inclined surface.

17. The dial illumination lamp according to claim 16, wherein the contact member further comprises a fixing portion, the fixing portion is disposed between the second connecting plate and the insertion portion, a limiting boss is provided at a side portion of the fixing portion, and the limiting boss protrudes outwards and is configured for abutting against the inside of the connecting hole.

* * * * *